(12) United States Patent
Marking (10) Patent No.: US 9,353,818 B2
(45) Date of Patent: May 31, 2016

(54) REMOTELY OPERATED BYPASS FOR A SUSPENSION DAMPER

(71) Applicant: Fox Factory, Inc., Watsonville, CA (US)

(72) Inventor: John Marking, El Cajon, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 294 days.

(21) Appl. No.: 14/038,507

(22) Filed: Sep. 26, 2013

(65) Prior Publication Data

US 2014/0027219 A1    Jan. 30, 2014

Related U.S. Application Data (63) Continuation of application No. 13/010,697, filed on Jan. 20, 2011, now Pat. No. 8,857,580.

(60) Provisional application No. 61/296,826, filed on Jan. 20, 2010.

(51) Int. Cl.

| | |
|---|---|
| *F16F 9/46* | (2006.01) |
| *F16F 9/18* | (2006.01) |
| *B60G 13/06* | (2006.01) |
| *B60G 17/08* | (2006.01) |

(Continued)

(52) U.S. Cl.
CPC . *F16F 9/18* (2013.01); *B60G 13/06* (2013.01); *B60G 17/08* (2013.01); *F16F 9/19* (2013.01); *F16F 9/46* (2013.01); *F16F 9/464* (2013.01); *B60G 2202/24* (2013.01); *F16F 9/34* (2013.01)

(58) Field of Classification Search
CPC ....... F16K 15/06; F16K 15/063; F16K 15/18; F16K 9/464; F16K 9/19; F16K 9/34; F16K 9/46; F16K 9/18
USPC .................. 251/324, 318, 149.11, 149.6, 14, 251/25–26, 28–30.02, 62–63.6; 188/313, 188/285–286, 322.13, 322.2, 299.1, 281, 188/266.1, 266.2
See application file for complete search history.

(56) References Cited

U.S. PATENT DOCUMENTS

| | | | |
|---|---|---|---|
| 2,492,331 A | 12/1949 | Spring | |
| 2,725,076 A * | 11/1955 | Hansen | F16K 15/063 137/107 |
| 2,838,140 A | 6/1958 | Rasmusson et al. | |

(Continued)

FOREIGN PATENT DOCUMENTS

| | | |
|---|---|---|
| DE | 3709447 A1 | 10/1988 |
| DE | 3738048 A1 | 5/1989 |

(Continued)

OTHER PUBLICATIONS

Electronic Translation of DE3709447A1.

*Primary Examiner* — Anna Momper (57) ABSTRACT

A damper assembly with a bypass for a vehicle comprises a pressure cylinder with a piston and piston rod for limiting the flow rate of damping fluid as passes from a first to a second side of said piston. A bypass provides fluid pathway between the first and second sides of the piston separately from the flow rare limitation. In one aspect, the bypass is remotely controllable from a passenger compartment of the vehicle. In another aspect, the bypass is remotely controllable based upon one or more variable parameters associated with the vehicle.

14 Claims, 4 Drawing Sheets

(51) Int. Cl.
*F16F 9/19* (2006.01)
*F16F 9/34* (2006.01)

(56) References Cited

U.S. PATENT DOCUMENTS

| | | | |
|---|---|---|---|
| 2,897,613 A | 8/1959 | Davidson et al. | |
| 2,941,629 A * | 6/1960 | Rohacs | F16F 9/34 137/514.3 |
| 2,991,804 A | 7/1961 | Merkle | |
| 3,202,413 A † | 8/1965 | Colmerauer | |
| 3,286,797 A | 11/1966 | Leibfritz et al. | |
| 3,420,493 A * | 1/1969 | Kraft | F16K 15/18 137/329.3 |
| 3,556,137 A * | 1/1971 | Billeter | E03D 3/02 137/543.15 |
| 3,714,953 A | 2/1973 | Solvang | |
| 3,791,408 A | 2/1974 | Saitou et al. | |
| 4,022,113 A * | 5/1977 | Blatt | F16K 15/02 137/513.5 |
| 4,072,087 A | 2/1978 | Mueller et al. | |
| 4,139,186 A | 2/1979 | Postema et al. | |
| 4,183,509 A | 1/1980 | Nishikawa et al. | |
| 4,333,668 A | 6/1982 | Hendrickson et al. | |
| 4,334,711 A | 6/1982 | Mazur et al. | |
| 4,337,850 A | 7/1982 | Shimokura et al. | |
| 4,491,207 A | 1/1985 | Boonchanta et al. | |
| 4,502,673 A | 3/1985 | Clark et al. | |
| 4,548,233 A | 10/1985 | Wolfges et al. | |
| 4,620,619 A | 11/1986 | Emura et al. | |
| 4,660,689 A | 4/1987 | Hayashi et al. | |
| 4,750,735 A * | 6/1988 | Furgerson | A63B 21/0083 188/313 |
| 4,765,648 A | 8/1988 | Mander et al. | |
| 4,826,207 A | 5/1989 | Yoshioka et al. | |
| 4,846,317 A | 7/1989 | Hudgens | |
| 4,919,166 A * | 4/1990 | Sims | A63B 21/0083 137/493 |
| 4,936,424 A | 6/1990 | Costa | |
| 4,949,989 A | 8/1990 | Kakizaki et al. | |
| 4,975,849 A | 12/1990 | Ema et al. | |
| 5,161,653 A † | 11/1992 | Hare | |
| 5,163,742 A | 11/1992 | Topfer et al. | |
| 5,178,242 A | 1/1993 | Nakamura et al. | |
| 5,203,584 A | 4/1993 | Butsuen et al. | |
| 5,207,774 A | 5/1993 | Wolfe et al. | |
| 5,230,364 A | 7/1993 | Leng et al. | |
| 5,277,283 A | 1/1994 | Yamaoka et al. | |
| 5,293,971 A | 3/1994 | Kanari | |
| 5,307,907 A | 5/1994 | Nakamura et al. | |
| 5,588,510 A | 12/1996 | Wilke | |
| 5,597,180 A | 1/1997 | Ganzel et al. | |
| 5,598,337 A | 1/1997 | Butsuen et al. | |
| 5,657,840 A | 8/1997 | Lizell | |
| 5,699,885 A | 12/1997 | Foerster | |
| 5,810,128 A | 9/1998 | Eriksson et al. | |
| 5,813,731 A | 9/1998 | Newman et al. | |
| 5,884,921 A | 3/1999 | Katsuda et al. | |
| 5,937,975 A | 8/1999 | Forster et al. | |
| 5,992,450 A | 11/1999 | Parker et al. | |
| 5,996,746 A † | 12/1999 | Turner | |
| 6,035,979 A | 3/2000 | Forster | |
| 6,058,340 A | 5/2000 | Uchiyama et al. | |
| 6,067,490 A | 5/2000 | Ichimaru et al. | |
| 6,092,011 A | 7/2000 | Hiramoto et al. | |
| 6,213,263 B1 | 4/2001 | De Frenne | |
| 6,254,067 B1 | 7/2001 | Yih | |
| 6,293,530 B1 | 9/2001 | Delorenzis et al. | |
| 6,296,092 B1 | 10/2001 | Marking et al. | |
| 6,318,525 B1 | 11/2001 | Vignocchi et al. | |
| 6,371,262 B1 | 4/2002 | Katou et al. | |
| 6,415,895 B2 | 7/2002 | Marking et al. | |
| 6,427,812 B2 | 8/2002 | Crawley et al. | |
| 6,474,753 B1 | 11/2002 | Rieth et al. | |
| 6,592,136 B2 | 7/2003 | Becker et al. | |
| 6,619,615 B1 | 9/2003 | Mayr et al. | |
| 6,966,412 B2 | 11/2005 | Braswell et al. | |
| 6,978,871 B2 | 12/2005 | Holiviers | |
| 6,991,076 B2 | 1/2006 | McAndrews | |
| 7,128,192 B2 | 10/2006 | Fox | |
| 7,234,680 B2 | 6/2007 | Hull et al. | |
| 7,270,221 B2 | 9/2007 | McAndrews | |
| 7,299,112 B2 | 11/2007 | LaPlante et al. | |
| 7,325,660 B2 | 2/2008 | Norgaard et al. | |
| 7,591,352 B2 | 9/2009 | Hanawa | |
| 7,628,259 B2 | 12/2009 | Norgaard et al. | |
| 7,654,369 B2 | 2/2010 | Murray et al. | |
| 7,722,069 B2 | 5/2010 | Shirai | |
| 7,779,974 B2 | 8/2010 | Timoney et al. | |
| 8,210,330 B2 | 7/2012 | Vandewal | |
| 8,770,357 B2 | 7/2014 | Sims et al. | |
| 8,857,580 B2 | 10/2014 | Marking | |
| 9,033,122 B2 | 5/2015 | Ericksen et al. | |
| 9,239,090 B2 | 1/2016 | Marking et al. | |
| 2001/0017334 A1 | 8/2001 | Vincent | |
| 2002/0121416 A1 | 9/2002 | Katayama et al. | |
| 2003/0001346 A1 | 1/2003 | Hamilton et al. | |
| 2003/0160369 A1 | 8/2003 | LaPlante et al. | |
| 2004/0099312 A1 | 5/2004 | Boyer et al. | |
| 2004/0222056 A1 | 11/2004 | Fox | |
| 2005/0077131 A1 | 4/2005 | Russell | |
| 2005/0098401 A1 | 5/2005 | Hamilton et al. | |
| 2005/0110229 A1 | 5/2005 | Kimura et al. | |
| 2006/0065496 A1 | 3/2006 | Fox | |
| 2006/0113834 A1 | 6/2006 | Hanawa | |
| 2006/0124414 A1 | 6/2006 | Hanawa | |
| 2006/0237272 A1 | 10/2006 | Huang | |
| 2006/0289258 A1 | 12/2006 | Fox | |
| 2007/0008096 A1 | 1/2007 | Tracy | |
| 2007/0039790 A1 | 2/2007 | Timoney et al. | |
| 2007/0051573 A1 | 3/2007 | Norgaard et al. | |
| 2008/0006494 A1 | 1/2008 | Vandewal | |
| 2008/0059025 A1 | 3/2008 | Furuichi et al. | |
| 2008/0093820 A1 | 4/2008 | McAndrews | |
| 2009/0001684 A1 | 1/2009 | McAndrews et al. | |
| 2009/0020382 A1 | 1/2009 | Van Weelden et al. | |
| 2009/0277736 A1 | 11/2009 | McAndrews et al. | |
| 2009/0288924 A1 | 11/2009 | Murray et al. | |
| 2009/0302558 A1 | 12/2009 | Shirai | |
| 2010/0010709 A1 | 1/2010 | Song | |
| 2010/0059964 A1 | 3/2010 | Morris | |
| 2010/0170760 A1 | 7/2010 | Marking | |
| 2011/0127706 A1 | 6/2011 | Sims et al. | |
| 2011/0174582 A1 | 7/2011 | Wootten et al. | |
| 2011/0214956 A1 | 9/2011 | Marking | |
| 2011/0284333 A1 | 11/2011 | Krog et al. | |
| 2012/0018263 A1 | 1/2012 | Marking | |
| 2012/0018264 A1 | 1/2012 | King | |
| 2012/0048665 A1 | 3/2012 | Marking | |
| 2012/0222927 A1 | 9/2012 | Marking | |
| 2012/0253599 A1 | 10/2012 | Shirai | |
| 2012/0305350 A1 | 12/2012 | Ericksen et al. | |
| 2013/0001030 A1 | 1/2013 | Goldasz et al. | |
| 2013/0292218 A1 | 11/2013 | Ericksen et al. | |
| 2015/0081171 A1 | 3/2015 | Ericksen et al. | |

FOREIGN PATENT DOCUMENTS

| | | | |
|---|---|---|---|
| DE | 3924166 C1 | 2/1991 | |
| DE | 4029090 A1 * | 3/1992 | F16J 15/3284 |
| DE | 4406918 A1 | 9/1994 | |
| EP | 1241087 A1 | 9/2002 | |
| EP | 2848582 A1 * | 3/2015 | B67D 1/125 |
| JP | 01106721 A | 4/1989 | |
| JP | 04203540 A | 7/1992 | |
| JP | 05149364 A | 6/1993 | |
| JP | 2007302211 A | 11/2007 | |

\* cited by examiner
† cited by third party

FIG.7

REMOTELY OPERATED BYPASS FOR A SUSPENSION DAMPER

CROSS-REFERENCE TO RELATED APPLICATIONS

This application is a continuation application of and claims the benefit of co-pending U.S. patent application Ser. No. 13/010,697 filed on Jan. 20, 2011 entitled "REMOTELY OPERATED BYPASS FOR A SUSPENSION DAMPER" by John Marking, which is incorporated herein, in its entirety, by reference, which application claims priority to and benefit of U.S. Provisional Patent Application 61/296,826 filed on Jan. 20, 2010 entitled "REMOTELY OPERATED BYPASS FOR A SUSPENSION DAMPER" by John Marking, which is incorporated herein, in its entirety, by reference.

BACKGROUND

Field of the Invention

Embodiments of the present invention generally relate to a damper assembly for a vehicle. More specifically, certain embodiments relate to a remotely operated bypass device used in conjunction with a vehicle damper.

Vehicle suspension systems typically include a spring component or components and a dampening component or components. Typically, mechanical springs, like helical springs are used with some type of viscous fluid-based dampening mechanism and the two are mounted functionally in parallel. In some instances features of the damper or spring are user-adjustable. What is needed is an improved method and apparatus for adjusting dampening characteristics, including remote adjustment.

SUMMARY OF THE INVENTION

The present invention may be used with a damper assembly having a bypass. In one aspect, the assembly comprises a cylinder with a piston and piston rod for limiting the flow rate of damping fluid as it passes from a first to a second portion of said cylinder. A bypass provides fluid pathway between the first and second portions of the cylinder and may be independent of, or in conjunction with, the aforementioned flow rate limitation. In one aspect, the bypass is remotely controllable from a passenger compartment of the vehicle. In another aspect, the bypass is remotely controllable based upon one or more variable parameters associated with the vehicle.

BRIEF DESCRIPTION OF THE DRAWINGS

So that the manner in which the above recited features can be understood in detail, a more particular description may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
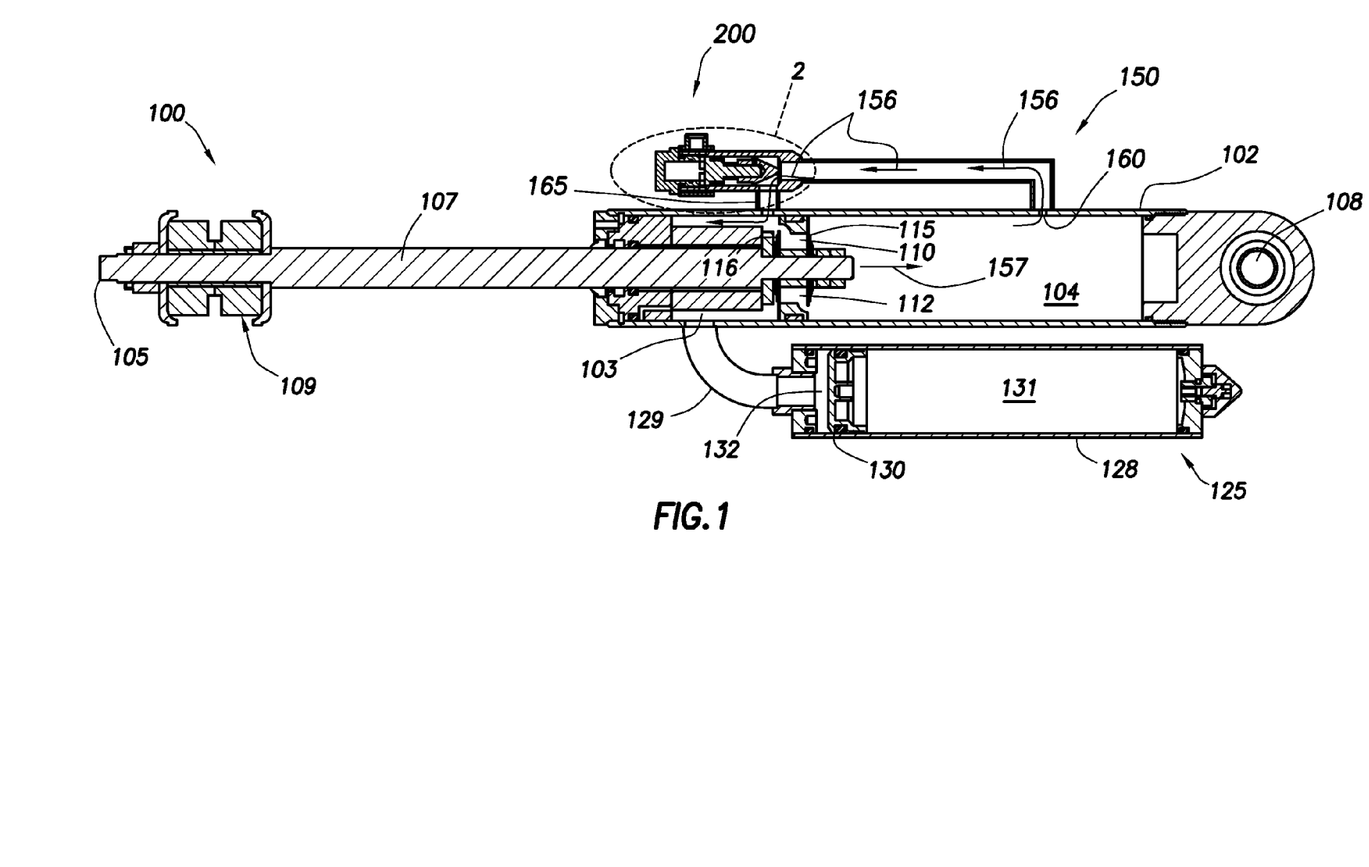
FIG. 1 is a section view showing a suspension damping unit with a remotely operable bypass.

As used herein, the terms "down" "up" "downward" "upward" "lower" "upper" and other directional references are relative and are used for reference only. FIG. 1 is a section view of a suspension damping unit 100. The damper includes a cylinder portion 102 with a rod 107 and a piston 105. Typically, the fluid meters from one side of the piston 105 to the other side by passing through flow paths 110, 112 formed in the piston 105. In the embodiment shown, shims 115, 116 are used to partially obstruct the flow paths 110, 112 in each direction. By selecting shims 115, 116 having certain desired stiffness characteristics, the dampening effects caused by the piston 105 can be increased or decreased and dampening rates can be different between the compression and rebound strokes of the piston 105. For example, shims 115 are configured to meter rebound flow from the rebound portion 103 of the cylinder 102 to the compression portion 104 of the cylinder 102. Shims 116, on the other hand, are configured to meter compression flow from the compression portion of the cylinder to the rebound portion. In one embodiment, shims 116 are not included on the rebound portion side, nor is there a compression flow path such as path 112, leaving the piston essentially "locked out" in the compression stroke without some means of flow bypass. Note that piston apertures (not shown) may be included in planes other than those shown (e.g. other than apertures used by paths 110 and 112) and further that such apertures may, or may not, be subject to the shims 115, 116 as shown (because for example, the shims 115, 116 may be clover-shaped or have some other non-circular shape).

A reservoir 125 is in fluid communication with the damper cylinder 102 for receiving and supplying damping fluid as the piston rod 107 moves in and out of the cylinder 102. The reservoir includes a cylinder portion 128 in fluid communication with a rebound portion 103 of the damper cylinder 102 via fluid conduit 129. The reservoir also includes a floating piston 130 with a volume of gas on a backside 131 ("blind end" side) of it, the gas being compressible as the reservoir cylinder 128, on the "frontside" 132 fills with damping fluid due to movement of the damper rod 107 and piston 105 into the damper cylinder 102. Certain features of reservoir type dampers are shown and described in U.S. Pat. No. 7,374,028, which is incorporated herein, in its entirety, by reference. The upper portion of the rod 107 is supplied with a bushing set 109 for connecting to a portion of a vehicle wheel suspension linkage. In another embodiment, not shown, the upper portion of the rod 107 (opposite the piston) may be supplied with an eyelet to be mounted to one part of the vehicle, while the lower part of the housing shown with an eyelet 108 is attached to another portion of the vehicle, such as the frame, that moves independently of the first part. A spring member (not shown) is usually mounted to act between the same portions of the vehicle as the damper. As the rod 107 and piston 105 move into cylinder 102 (during compression), the damping fluid slows the movement of the two portions of the vehicle relative to each other due to the incompressible fluid moving through the shimmed paths 112 (past shims 116) provided in the piston 105 and/or through a metered bypass 150, as will be described herein. As the rod 107 and piston 105 move out of the cylinder 102 (during extension or "rebound") fluid meters again through shimmed paths 110 and the flow rate and corresponding rebound rate is controlled by the shims 115.

In FIG. 1, the piston is shown at full extension and moving downward in a compression stroke, the movement shown by arrow 157. A bypass 150 includes a tubular body 155 that communicates with the damper cylinder 102 through entry 160 and exit 165 pathways. The bypass assembly 150 permits damping fluid to travel from a first side of the piston 105 to the other side without traversing shimmed flow paths 110, 112 that may otherwise be traversed in a compression stroke of the damper. In FIG. 1, the bypass 150 is shown in an "open" position with the flow of fluid through the bypass shown by arrows 156 from a compression side to a rebound side of the piston 105. In the embodiment of FIG. 1, the bypass includes a remotely controllable, needle-type check valve/throttle valve 200, located proximate an exit pathway 165 allowing flow in direction 156 and checking flow in opposite direction.

The entry pathway 160 to the bypass 150 in the embodiment shown in FIG. 1, is located towards a lower end of the damper cylinder 102. In one embodiment, as selected by design, the bypass will not operate after the piston 105 passes the entry pathway 160 near the end of a compression stroke. This "position sensitive" feature ensures increased dampening will be in effect near the end of the compression stoke to help prevent the piston from approaching a "bottomed out" position (e.g. impact) in the cylinder 102. In some instances, multiple bypasses are used with a single damper and the entry pathways for each may be staggered axially along the length of the damper cylinder in order to provide an ever-increasing amount of dampening (and less bypass) as the piston moves through its compression stroke and towards the bottom of the damping cylinder. Each bypass may include some or all of the features described herein. Certain bypass damper features are described and shown in U.S. Pat. Nos. 6,296,092 and 6,415,895, each of which are incorporated herein, in its entirety, by reference. Additionally, the bypass and valve of the present embodiments can be used in any combination with the bypass valves shown and described in co-pending U.S. patent application Ser. No. 12/684,072.

Figure 2:
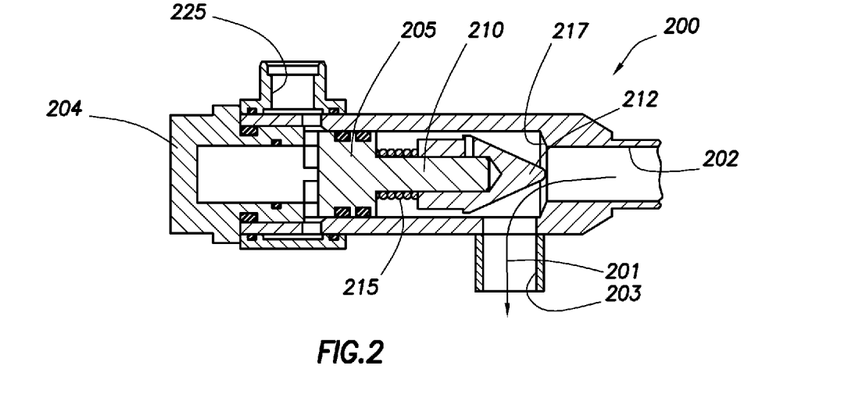
FIG. 2 is an enlarged section view showing the remotely operable valve of the bypass in the open position.
Figure 3:
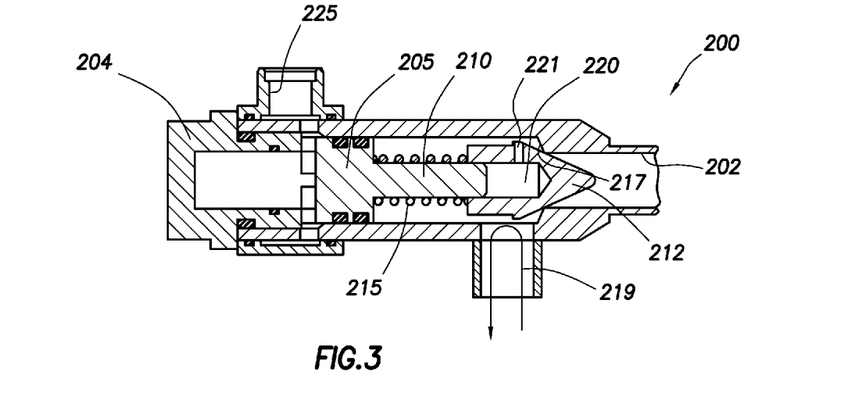
FIG. 3 is a section view showing the valve of FIG. 2 in a closed position.
Figure 4:
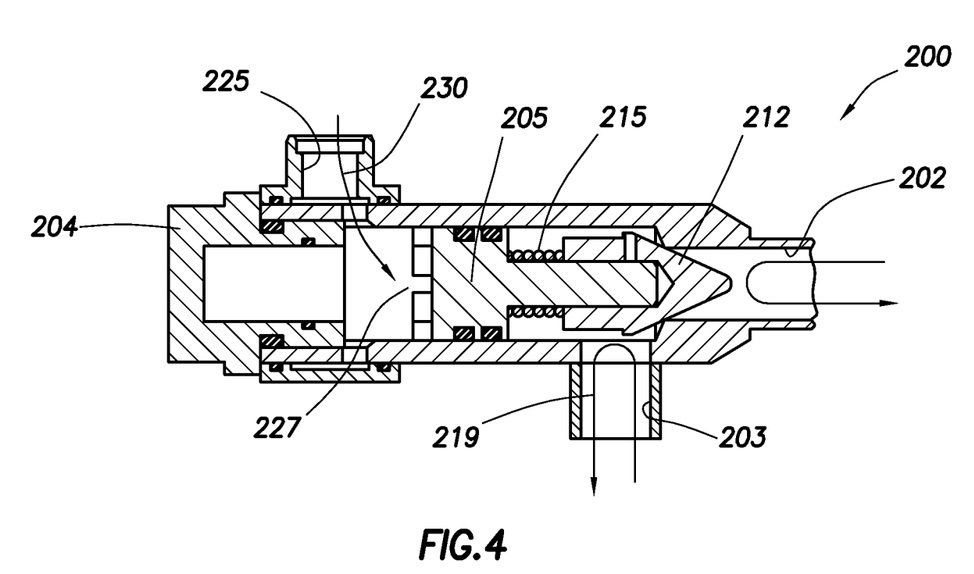
FIG. 4 is a section view showing the valve of FIG. 2 in a locked-out position.

FIGS. 2, 3 and 4 are enlarged views showing the remotely operable needle valve 200 in various positions. In FIG. 2, the valve is in a damping-open position (fluid path shown by arrow 201) permitting the bypass to operate in a compression stroke of the damper 100. The valve includes a valve body 204 housing a movable piston 205 which is sealed within the body. Three fluid communication points are provided in the body including an inlet 202 and outlet 203 for fluid passing through the valve 200 as well as an inlet 225 for control fluid as will be described herein. Extending from a first end of the piston 205 is a shaft 210 having a cone-shaped member 212 (other shapes such as spherical or flat, with corresponding seats, will also work suitably well) disposed on an end thereof. The cone-shaped member 212 is telescopically mounted relative to, and movable on, the shaft 210 and is biased in an extended position (FIG. 3) due to a spring 215 coaxially mounted on the shaft 210 between the member 212 and the piston 205. Due to the spring biasing, the cone-shaped member 212 normally seats itself against a seat 217 formed in an interior of the body 204. In the damping open position shown however, fluid flow through the bypass has provided adequate force on the member 212 to urge it backwards, at least partially loading the spring 215 and creating fluid path 201 from the bypass into a rebound area of the damper cylinder as shown in FIG. 1. The characteristics of the spring 215 are typically chosen to permit the valve 200 (e.g. member 212) to open at a predetermined bypass pressure, with a predetermined amount of control pressure applied to inlet 225, during a compression stroke of the damper 100. For a given spring 215, higher control pressure at inlet 225 will result in higher bypass pressure required to open the valve 200 and correspondingly higher damping resistance in the bypass 150 (more compression damping due to that bypass). In one embodiment, the valve is open in both directions when the valve member 205 is "topped out" against valve body 204. In another embodiment however, when the valve piston 205 is abutted or "topped out" against valve body 204 the spring and relative dimensions of the valve 200 still allow for the cone member to engage the valve seat thereby closing the valve. In such embodiment backflow from the rebound side of the cylinder 102 to the compression side is always substantially closed and cracking pressure from flow along path 156 is determined by the pre-compression in the spring. In such embodiment, additional fluid pressure may be added to the inlet through port 225 to increase the cracking pressure for flow along path 156 and thereby increase compression damping through the bypass over that value provided by the spring compression "topped out." It is generally noteworthy that while the descriptions herein often relate to compression damping bypass and rebound shut off, some or all of the bypass channels (or channel) on a given suspension unit may be configured to allow rebound damping bypass and shut off or impede compression damping bypass.

FIG. 3 shows the valve 200 in a closed position (which it assumes during a rebound stroke of the damper). As shown, the cone shaped member 212 is seated against seat 217 due to the force of the spring 215 and absent an opposite force from fluid entering the valve along path 156 from the bypass. As member 212 telescopes out, a gap 220 is formed between the end of the shaft 210 and an interior of member 212. A vent 221 is provided to relieve any pressure formed in the gap. With the fluid path 201 closed, fluid communication is substantially shut off from the rebound side of the cylinder into the valve body (and hence through the bypass back to the compression side is closed) and its "dead-end" path is shown by arrow 219.

Inlet 225 is formed in the valve body 204 for operation of the valve. In one embodiment inlet 225 may be pressurized to shift the valve to a third or "locked-out" position. In FIG. 4, the valve 200 is shown in the locked-out position, thereby preventing fluid flow through the bypass in either direction regardless of compression or rebound stroke. In the embodiment shown, the control inlet 225 provides a fluid path 230 to a piston surface 227 formed on an end of the piston 205, opposite the cone-shaped member 212. Specifically, activating pressure is introduced via inlet 225 to move the piston 205 and with it, member 212 toward seat 217. Sufficient activating pressure fully compresses the spring 215 (substantial stack out) and/or closes the gap 220 thereby closing the cone 212 against the seat, sealing the bypass to both compression flow and rebound flow. In the embodiment shown, the valve 200 can be shifted to the third, locked-out position from either the first, open position or the second, closed position. Note that, when in the "locked out" position, the valve as shown will open to compression flow along path 156 when the compression flow pressure acting over the surface area of the seated valve cone 212 exceeds the inlet 225 pressure acting over the surface area of the piston 205. Such inlet 225 pressure may be selected to correspond therefore to a desired compression overpressure relief value or "blow off" value thereby allowing compression bypass under "extreme" conditions even when the bypass is "locked out".

In the embodiment illustrated, the valve 200 is intended to be shifted to the locked-out position with control fluid acting upon piston 205. In one embodiment, the activating pressure via inlet 225 is adjusted so that the valve 200 is closed to rebound fluid (with the cone-shaped member 212 in seat 217) but with the spring 215 not fully compressed or stacked out. In such a position, a high enough compression force (e.g. compression flow) will still open the valve 200 and allow fluid to pass through the valve in a compression stroke. In one arrangement, the activating pressure, controlled remotely, may be adjusted between levels where the lock-out is not energized and levels where the lock-out is fully energized. The activating pressure may also be adjusted at intermediate levels to create more or less damping resistance through the bypass. The activating pressure may be created by hydraulic or pneumatic input or any other suitable pressure source.

In one example, the valve 200 is moved to a locked-out position and the bypass feature disabled by remote control from a simple operator-actuated switch located in the passenger compartment of the vehicle. In one embodiment, fluid pressure for controlling (e.g. locking-out) the valve 200 is provided by the vehicle's on-board source of pressurized hydraulic fluid created by, for example, the vehicle power steering system. In one embodiment, pneumatic pressure is used to control (e.g. close) the valve 200 where the pneumatic pressure is generated by an on-board compressor and accumulator system and conducted to the valve via a fluid conduit. In one embodiment, a linear electric motor (e.g. solenoid), or other suitable electric actuator, is used, in lieu of the aforementioned inlet 225 pressure, to move the "piston" axially within valve body. A shaft of the electric actuator (not shown) may be fixed to the piston such that axial movement of the shaft causes axial movement of the piston which in turn causes movement of the cone 212 (and compression of the spring as appropriate). In one embodiment, the electric actuator is configured to "push" the piston towards a closed position and to "pull" the piston away from the closed position depending on the direction of the current switched through the actuator.

Figure 5:
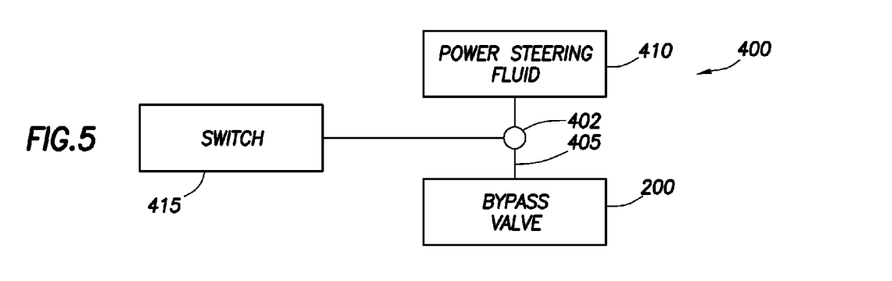
FIG. 5 is a schematic diagram showing a control arrangement for a remotely operated bypass.

FIG. 5 is a schematic diagram illustrating a sample circuit 400 used to provide remote control of a bypass valve using a vehicle's power steering fluid (although any suitable fluid pressure source may be substituted for reservoir 410 as could be an electrical current source in the case of an electrically actuated valve 200). As illustrated, a fluid pathway 405 having a switch-operated valve (and/or pressure regulator) 402 therein runs from a fluid (or current) reservoir 410 that is kept pressurized by, in one embodiment, a power steering pump (not shown) to a bypass valve 200 that is operable, for example, by a user selectable dash board switch 415. The valve 402 permits fluid to travel to the bypass valve 200, thereby urging it to a closed position. When the switch 415 is in the "off" position, working pressure within the damper, and/or a biasing member such as a spring or annular atmospheric chamber (not shown), returns the bypass to its normally-open position (with or without residual spring compression as designed). Hydraulically actuated valving for use with additional components is shown and described in U.S. Pat. No. 6,073,536 and that patent is incorporated by reference herein in its entirety.

While FIG. 5 is simplified and involves control of a single bypass valve, it will be understood that the valve 402 could be plumbed to simultaneously or selectively (e.g. multi-position valve) provide a signal to two or more (e.g. four) bypass valves operable with two or more vehicle dampers and/or with a single damper having multiple bypass channels and multiple corresponding valves (e.g. 200) (or multiple dampers having multiple bypass channels). Additional switches could permit individual operation of separate damper bypass valves in individual bypass channels, whether on separate dampers or on the same multiple bypass damper, depending upon an operator's needs. While the example of FIG. 5 uses fluid power for operating the bypass valve, a variety of means are available for remotely controlling a valve. For instance, a source of electrical power from a 12 volt battery could be used to operate a solenoid member, thereby shifting a piston in bypass valve 200 between open and closed positions. The valve or solenoid operating signal can be either via a physical conductor or an RF signal (or other wireless such as Bluetooth, WiFi, ANT) from a transmitter operated by the switch 415 to a receiver operable on the bypass valve 200 (which would derive power from the vehicle power system such as 12 volt).

A remotely operable bypass like the one described above is particularly useful with an on/off road vehicle. These vehicles can have as much as 20" of shock absorber travel to permit them to negotiate rough, uneven terrain at speed with usable shock absorbing function. In off-road applications, compliant dampening is necessary as the vehicle relies on its long travel suspension when encountering often large off-road obstacles. Operating a vehicle with very compliant, long travel suspension on a smooth road at higher speeds can be problematic due to the springiness/sponginess of the suspension and corresponding vehicle handling problems associated with that (e.g. turning roll, braking pitch). Such compliance can cause reduced handling characteristics and even loss of control. Such control issues can be pronounced when cornering at high speed as a compliant, long travel vehicle may tend to roll excessively. Similarly, such a vehicle may pitch and yaw excessively during braking and acceleration. With the remotely operated bypass dampening and "lock out" described herein, dampening characteristics of a shock absorber can be completely changed from a compliantly dampened "springy" arrangement to a highly dampened and "stiffer" (or fully locked out) system ideal for higher speeds on a smooth road. In one embodiment where compression flow through the piston is completely blocked, closure of the bypass 150 results in substantial "lock out" of the suspension (the suspension is rendered essentially rigid). In one embodiment where some compression flow is allowed through the piston (e.g. port 112 and shims 116), closure of the bypass 150 (closure of valve 200) results in a stiffer but still functional compression damper. In one embodiment, the shims 116 are sized, to optimize damping when the bypass 150 is open and when bypass 150 is closed based on total anticipated driving conditions. In one embodiment the bypass valve 200 is closed but may be opened at a predetermined compression flow pressure resulting in fairly stiff handling but maintaining an ability for the vehicle to absorb relatively large bumps. In one embodiment a bypass channel having an opening 160 located axially toward an upward (or "rebound" end) end of cylinder 102 remains wide open while other bypass channels having corresponding openings 160 located axially more toward the compression end of cylinder 102 are closed or highly restricted. Such would result in a suspension that would readily absorb small amplitude compressions (smooth highway ride) but would resist large compression deflections of low force magnitude (as during heavy cornering or braking) and would absorb large deflections of high force magnitude. A vehicle so configured would ride well on pavement (smooth surface), would absorb large unexpected bumps and would generally not wallow when cornering or braking.

Figure 6:
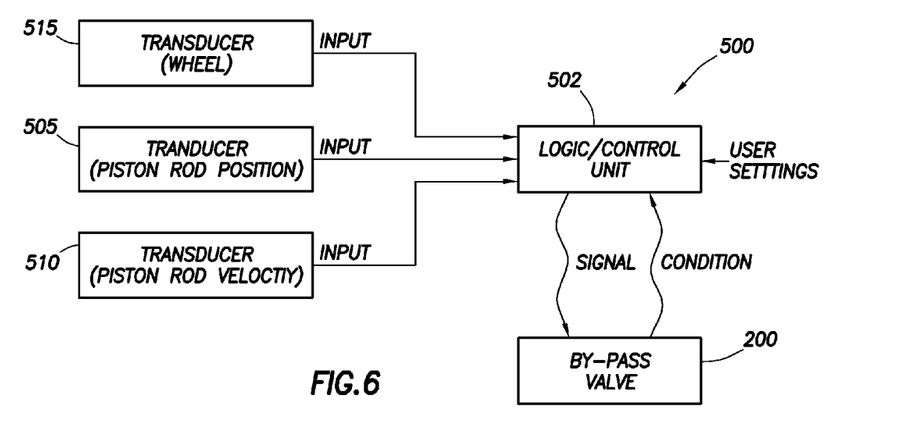
FIG. 6 is a schematic diagram showing another control arrangement for a remotely operated bypass.

In addition to, or in lieu of, the simple, switch operated remote arrangement of FIG. 5, the remote bypass can be operated automatically based upon one or more driving conditions. FIG. 6 shows a schematic diagram of a remote control system 500 based upon any or all of vehicle speed, damper rod speed, and damper rod position. One embodiment of FIG.

6 is designed to automatically increase dampening in a shock absorber in the event a damper rod reaches a certain velocity in its travel towards the bottom end of a damper at a predetermined speed of the vehicle. In one embodiment the system adds dampening (and control) in the event of rapid operation (e.g. high rod velocity) of the damper to avoid a bottoming out of the damper rod as well as a loss of control that can accompany rapid compression of a shock absorber with a relative long amount of travel. In one embodiment the system adds dampening (e.g. closes or throttles down the bypass) in the event that the rod velocity in compression is relatively low, but the rod progresses past a certain point in the travel. Such configuration aids in stabilizing the vehicle against excessive low rate suspension movement events such as cornering roll, braking and acceleration yaw and pitch and "g-out."

FIG. 6 illustrates, for example, a system including three variables: rod speed, rod position and vehicle speed. Any or all of the variables shown may be considered by processor 502 in controlling the valve 200. Any other suitable vehicle operation variable may be used in addition to or in lieu of the variables 515, 505, 510 such as for example piton rod compression strain, eyelet strain, vehicle mounted accelerometer (or tilt/inclinometer) data or any other suitable vehicle or component performance data. In one embodiment piston 105 position within cylinder 102 is determined using an accelerometer to sense modal resonance of cylinder 102. Such resonance will change depending on the position of the piston 105 and an on-board processor (computer) is calibrated to correlate resonance with axial position. In one embodiment, a suitable proximity sensor or linear coil transducer or other electro-magnetic transducer is incorporated in the dampening cylinder to provide a sensor to monitor the position and/or speed of the piston (and suitable magnetic tag) with respect to the cylinder. In one embodiment, the magnetic transducer includes a waveguide and a magnet, such as a doughnut (toroidal) magnet that is joined to the cylinder and oriented such that the magnetic field generated by the magnet passes through the piston rod and the waveguide. Electric pulses are applied to the waveguide from a pulse generator that provides a stream of electric pulses, each of which is also provided to a signal processing circuit for timing purposes. When the electric pulse is applied to the waveguide a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines. By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, either digital, or analog, proportional to the calculated distance and/or velocity. A transducer-operated arrangement for measuring rod speed and velocity is described in U.S. Pat. No. 5,952,823 and that patent is incorporated by reference herein in its entirety.

While a transducer assembly located at the damper measures rod speed and location, a separate wheel speed transducer for sensing the rotational speed of a wheel about an axle includes housing fixed to the axle and containing therein, for example, two permanent magnets. In one embodiment the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 6, a logic unit 502 with user-definable settings receives inputs from the rod speed 510 and location 505 transducers as well as the wheel speed transducer 515. The logic unit is user-programmable and depending on the needs of the operator, the unit records the variables and then if certain criteria are met, the logic circuit sends its own signal to the bypass to either close or open (or optionally throttle) the bypass valve 200. Thereafter, the condition of the bypass valve is relayed back to the logic unit 502.

Figure 7:
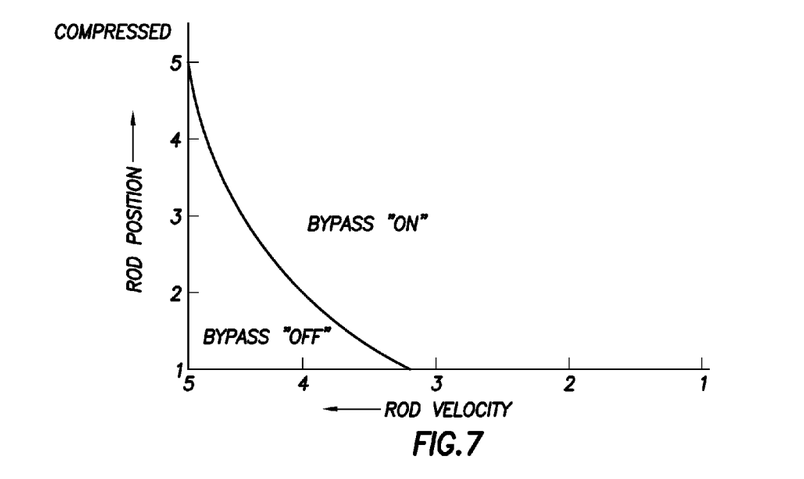
FIG. 7 is a graph showing some operational characteristics of the arrangement of FIG. 4.

FIG. 7 is a graph that illustrates a possible operation of one embodiment of the bypass assembly 500 of FIG. 6. The graph assumes a constant vehicle speed. For a given vehicle speed, rod position is shown on a y axis and rod velocity is shown on an x axis. The graph illustrates the possible on/off conditions of the bypass at combinations of relative rod position and relative rod velocity. For example, it may be desired that the bypass is operable (bypass "on") unless the rod is near its compressed position and/or the rod velocity is relatively high (such as is exemplified in FIG. 7). The on/off configurations of FIG. 7 are by way of example only and any other suitable on/off logic based on the variable shown or other suitable variables may be used. In one embodiment it is desirable that the damper become relatively stiff at relatively low rod velocities and low rod compressive strain (corresponding for example to vehicle roll, pitch or yaw) but remains compliant in other positions. In one embodiment the piston rod 107 includes a "blow off" (overpressure relief valve typically allowing overpressure flow from the compression side to the rebound side) valve positioned in a channel coaxially disposed though the rod 107 and communicating one side of the piston (and cylinder) with the other side of the piston (and cylinder) independently of the apertures 110,112 and the bypass 150.

In one embodiment, the logic shown in FIG. 6 assumes a single damper but the logic circuit is usable with any number of dampers or groups of dampers. For instance, the dampers on one side of the vehicle can be acted upon while the vehicles other dampers remain unaffected.

While the examples illustrated relate to manual operation and automated operation based upon specific parameters, the remotely operated bypass can be used in a variety of ways with many different driving and road variables. In one example, the bypass is controlled based upon vehicle speed in conjunction with the angular location of the vehicle's steering wheel. In this manner, by sensing the steering wheel turn severity (angle of rotation), additional dampening can be applied to one damper or one set of dampers on one side of the vehicle (suitable for example to mitigate cornering roll) in the event of a sharp turn at a relatively high speed. In another example, a transducer, such as an accelerometer measures other aspects of the vehicle's suspension system, like axle force and/or moments applied to various parts of the vehicle, like steering tie rods, and directs change to the bypass valve positioning in response thereto. In another example, the bypass can be controlled at least in part by a pressure transducer measuring pressure in a vehicle tire and adding dampening characteristics to some or all of the wheels in the event of, for example, an increased or decreased pressure reading. In one embodiment the damper bypass or bypasses are controlled in response to braking pressure (as measured for example by a brake pedal sensor or brake fluid pressure sensor or accelerometer) In still another example, a parameter might include a gyroscopic mechanism that monitors vehicle trajectory and identifies a "spin-out" or other loss of control condition and adds and/or reduces dampening to some or all of the vehicle's dampers in the event of a loss of control to help the operator of the vehicle to regain control.

While the foregoing is directed to embodiments of the present invention, other and further embodiments of the invention may be devised without departing from the basic scope thereof, and the scope thereof is determined by the claims that follow.

The invention claimed is:

1. A throttle valve for allowing and limiting a flow of a fluid there through, said throttle valve comprising:
   a movable piston sealed within a valve body of said throttle valve, said movable piston comprising:
      a shaft coupled to and extending from a first end of said movable piston;
      a biasing member telescopically mounted relative to, and moveable on, a first end of said shaft;
      a spring coaxially mounted on said shaft and disposed between said biasing member and said piston;
   an inlet and an outlet configured for enabling said fluid to flow through said throttle valve;
   a seat disposed within said valve body, and upon which said biasing member sits when said spring biases said shaft toward an extended position; and
   a locked-out position preventing a flow of said fluid in any direction, wherein during said locked-out position, said spring is fully compressed, thereby closing said biasing member against said spring and closing a gap, wherein said gap is formed between a first end of said shaft and an interior of said biasing member.

2. The throttle valve of claim 1, operable to be disposed in a bypass assembly of a vehicle suspension damper.

3. The throttle valve of claim 2, wherein the vehicle suspension damper comprises:
   a cylinder having an interior and a piston assembly comprising a piston and a piston rod and said fluid therein, wherein said piston is positioned in said interior and separates said interior into a compression side and a rebound side;
   a passageway through said piston allowing and limiting a flow rate of said fluid through the piston in at least one direction, wherein said bypass assembly comprises:
      a fluid pathway for a flow of said fluid there through from said compression side and to said rebound side of said piston;
      an entry pathway; and
      an exit pathway, wherein said throttle valve is disposed proximate said exit pathway, wherein said bypass assembly fluidly communicates with said cylinder through said entry pathway and said exit pathway.

4. The throttle valve of claim 1, wherein said throttle valve is remotely operable.

5. The throttle valve of claim 1, wherein said shaft comprises:
   an extended position, in which said spring biases said shaft in said extended position.

6. The throttle valve of claim 1, further comprising:
   a seat disposed within said valve body, and upon which said biasing member sits when said spring biases said shaft toward an extended position.

7. The throttle valve of claim 6, further comprising:
   a gap formed between a first end of said shaft and an interior of said biasing member when said biasing member is seated against said seat due to a force of said spring against said biasing member.

8. The throttle valve of claim 7, further comprising:
   a vent disposed within said biasing member and coupled to said gap, said vent configured for providing a relief of fluid pressure in formed in said gap.

9. The throttle valve of claim 1, further comprising:
   a control inlet disposed at a second end of said piston and within said valve body, said control inlet for receiving said fluid at a predetermined pressure.

10. The throttle valve of claim 2, further comprising:
   an open position such that said fluid may pass through said throttle valve via said inlet and said outlet, and wherein while in said open position, said biasing member is moved away from said seat.

11. The throttle valve of claim 10, further comprising:
   a control inlet disposed at a second end of said piston and within said valve body, wherein when said throttle valve is in said open position and during a compression stroke of a vehicle suspension damper:
      a predetermined amount of pressure is applied to said fluid within said bypass assembly; and
      a predetermined amount of control pressure is applied to said fluid being received at said control inlet at a predetermined pressure.

12. The throttle valve of claim 1, further comprising:
   a closed position such that said fluid may not pass through said throttle valve via said inlet and said outlet.

13. The throttle valve of claim 1, wherein said locked-out position comprises:
   a control inlet disposed at a second end of said piston and within said valve body, said control inlet for receiving said fluid at a predetermined pressure; and
   an activating pressure introduced via said control inlet for moving said piston and said biasing member toward said seat.

14. The throttle valve of claim 1, wherein said outlet is disposed such that said fluid is communicated from said outlet to a rebound side of a vehicle suspension damper.

* * * * *